(12) United States Patent
Guckel et al.

(10) Patent No.: US 7,789,449 B2
(45) Date of Patent: Sep. 7, 2010

(54) FOLDING TOP FOR A MOTOR VEHICLE

(75) Inventors: Martin Guckel, Neuhausen (DE);
Bernhard Schenk, Aidlingen (DE);
Juergen Schrader, Weil im Schoenbuch (DE)

(73) Assignee: Daimler AG, Stuttgart (DE)

( * ) Notice: Subject to any disclaimer, the term of this patent is extended or adjusted under 35 U.S.C. 154(b) by 286 days.

(21) Appl. No.: 12/160,671

(22) PCT Filed: Jan. 10, 2007

(86) PCT No.: PCT/EP2007/000165
§ 371 (c)(1),
(2), (4) Date: Jul. 11, 2008

(87) PCT Pub. No.: WO2007/082659

PCT Pub. Date: Jul. 26, 2007

(65) Prior Publication Data
US 2010/0156135 A1 Jun. 24, 2010

(30) Foreign Application Priority Data
Jan. 12, 2006 (DE) .................... 10 2006 001 513

(51) Int. Cl.
*B60J 1/18* (2006.01)
(52) U.S. Cl. .............................. 296/107.07; 296/146.14
(58) Field of Classification Search ............ 296/107.07, 296/146.14
See application file for complete search history.

(56) References Cited

U.S. PATENT DOCUMENTS

| 4,852,935 | A | * | 8/1989 | Varner ................... 296/146.14 |
| 5,195,798 | A | | 3/1993 | Klein et al. |
| 5,265,930 | A | | 11/1993 | Klein et al. |
| 5,746,470 | A | | 5/1998 | Seel et al. |
| 5,823,606 | A | | 10/1998 | Schenk et al. |
| 6,019,416 | A | | 2/2000 | Beierl |
| 6,086,136 | A | | 7/2000 | Jambor et al. |

(Continued)

FOREIGN PATENT DOCUMENTS

DE 40 38 074 C1 10/1991

(Continued)

OTHER PUBLICATIONS

International Search Report dated May 4, 2007 with English translation of relevant portion (Six (6) Pages).

(Continued)

*Primary Examiner*—Joseph D Pape
(74) *Attorney, Agent, or Firm*—Crowell & Moring LLP

(57) ABSTRACT

A folding top for a motor vehicle is provided. The folding top includes a rear roof part which delimits a window opening for a rear window and which is displaceable about a main pivot axis in order to transfer the folding top from a closed position into a storage position. The rear window is pivotable relative to the rear roof part about a window pivot axis which extends at a distance from the main pivot axis. The rear window bears against the rear roof part from the outside when the folding top is in the closed position and, after the folding top has been transferred into its storage position, is moved at least by way of a partial region through the window opening.

19 Claims, 3 Drawing Sheets

U.S. PATENT DOCUMENTS

| | | |
|---|---|---|
| 6,123,381 A | 9/2000 | Schenk |
| 6,131,988 A | 10/2000 | Queveau et al. |
| 6,857,685 B2 | 2/2005 | Wagner |

FOREIGN PATENT DOCUMENTS

| | | |
|---|---|---|
| DE | 41 00 240 C1 | 3/1992 |
| DE | 44 45 580 C1 | 12/1995 |
| DE | 44 45 944 C1 | 4/1996 |
| DE | 197 51 660 C1 | 3/1999 |
| DE | 198 07 490 C1 | 9/1999 |
| DE | 101 55 887 A1 | 4/2003 |
| DE | 699 04 108 T2 | 4/2003 |
| DE | 102 18 874 B4 | 12/2003 |
| DE | 102 49 640 A1 | 1/2004 |
| EP | 0 922 597 A1 | 6/1999 |

OTHER PUBLICATIONS

German Office Action dated Oct. 4, 2006 with English translation (Eight (8) Pages).

Written Report of the International Search Agency with English translation of relevant portion (Seven (7) Pages).

* cited by examiner

FOLDING TOP FOR A MOTOR VEHICLE

BACKGROUND AND SUMMARY OF THE INVENTION

The invention relates to a folding top for a motor vehicle, comprising a rear roof part which delimits a window opening for a rear window and which is displaceable about a main pivot axis in order to transfer the folding top from a closed position into a storage position, wherein the rear window is pivotable relative to the rear roof part about a window pivot axis which extends at a distance from the main pivot axis.

German patent document number DE 198 07 490 C1 discloses a folding top of this type in which a rear roof part connected to an upper roof part in an articulated manner can be stowed away from a closed position into a storage position within a trunk space which can be used as a folding-top storage space. The upper and the rear roof part are intended to be displaced by means of laterally arranged parallelogram linkages about a main pivot axis, embodied as a pivot pin fixed to the vehicle body, which extends in the transverse direction of the vehicle at the lower end of the rear roof part. Lateral C-pillars of the rear roof part externally delimit a rear window which extends downwardly to the level of a rear-end and folding-top compartment lid and upwardly as far as the rear end of the upper roof part. The rear window is mounted on the C-pillars of the rear roof part such that it can be rotated about a window pivot axis extending in the transverse direction of the vehicle. To increase the remaining trunk space volume with the folding top opened, the rear window is pivoted upwardly relative to the rear roof part.

In order to make it possible to achieve such a pivoting movement of the rear window relative to the rear roof part, the rear window must bear, when the folding top is in the closed position, from the inside against the edge regions of the rear roof part which delimit the window opening. Accordingly, there must also be provided a window seal on the rear window-facing inner side of the edge regions of the rear roof part which delimit the window opening. In order to be able to ensure that the folding top is sealed even when the motor vehicle is traveling at high speeds, the window seal must therefore have a very complicated structural design between the inner side of the rear roof part and the rear window.

It is therefore the object of the present invention to provide a folding top which is designed in a structurally simpler manner.

This object is achieved according to the invention by a folding top that includes a rear window that bears against the rear roof part from the outside when the folding top is in the closed position and, after the folding top has been transferred into its storage position, is moved at least by way of a partial region through the window opening.

Provision is made in the case of the folding top according to the invention for the rear window to bear against the rear roof part from the outside when the folding top is in the closed position and, after the folding top has been transferred into its storage position, for this rear window to be moved at least by way of a partial region through the window opening. In other words, provision is thus made according to the invention for the rear window to bear from outside against the rear roof part with the folding top closed. This makes it possible in a structurally simple manner to arrange the window seal between the outer side of the rear roof part and the inner side of the rear window so as to ensure, with reasonable structural outlay, that the folding top can be sealed tight even when the vehicle is traveling at relatively high speeds.

In order for the rear window to be able to achieve its raised position with respect to the rear roof part when the folding top is in the storage position, this rear window must be able to be moved at least by way of a partial region through the window opening when transferring the folding top into its storage position. For this purpose, provision is made according to the invention to arrange or to move the rear window relative to the rear roof part such that it is possible in particular for the lateral C-pillars to be moved past the associated lateral window edges of the rear window.

The rear window can be moved through the window opening in a particularly simple manner if its window pivot axis is arranged at a distance in front of the main pivot axis of the rear roof part. As a result, points on the rear window and on the rear roof part which are superposed, for example, when the folding top is in the closed position come to lie at a distance behind one another in the storage position. Accordingly, at least a partial region of the rear window can be guided in a simple manner through the window opening.

In a further refinement of the invention, a trapezoidal rear window has been shown to be particularly advantageous in which the upper side of the trapezoid is designed to be shorter than the lower side of the trapezoid in the closed position. If, accordingly, the rear window and the window opening, which lie one above the other in the closed position, are brought into different positions with respect to the longitudinal direction of the vehicle in the storage position, an end region of the rear window assigned to the shorter side of the trapezoid can thus be guided in a simple manner through the associated region of the window opening.

It has further been shown to be advantageous to arrange both the pivot pin forming the main pivot axis and the pivot pin forming the window pivot axis fixedly on the body of the motor vehicle. This makes it possible, for example, to achieve a considerable distance between the two pivot pins/axes so that the rear window and the rear roof part can be displaced along correspondingly different movement trajectories.

An easily preassembleable folding top can be provided here by mounting the rear window and the rear roof part on lateral brackets in the region of the window pivot axis and the main pivot axis, respectively, these brackets being connectable to the body of the open motor vehicle in a simple manner during the final assembly.

It is possible to ensure that the rear window is guided through the window opening in a particularly operationally reliable manner and to ensure that the folding top is reliably opened by first of all folding down the rear window completely into the storage position before the rear roof part is transferred from the closed position into the storage position. The rear window is then guided through the window opening by guiding the rear roof part around the rear window during the opening movement of this rear roof part.

A particularly secure arrangement of the rear window within the folding-top storage space is obtained if it is covered on the upper side by an upper, preferably intrinsically rigid, roof part of the folding top.

Finally, a reduction in the number of components used and in the required overall space can be achieved by using a common drive mechanism for the rear roof part and the rear window.

BRIEF DESCRIPTION OF THE DRAWING FIGURES

Further advantages, features and details of the invention will become apparent from the following description of a preferred exemplary embodiment and with reference to the drawings, in which.

DETAILED DESCRIPTION OF THE PREFERRED EMBODIMENTS

Figure 1:
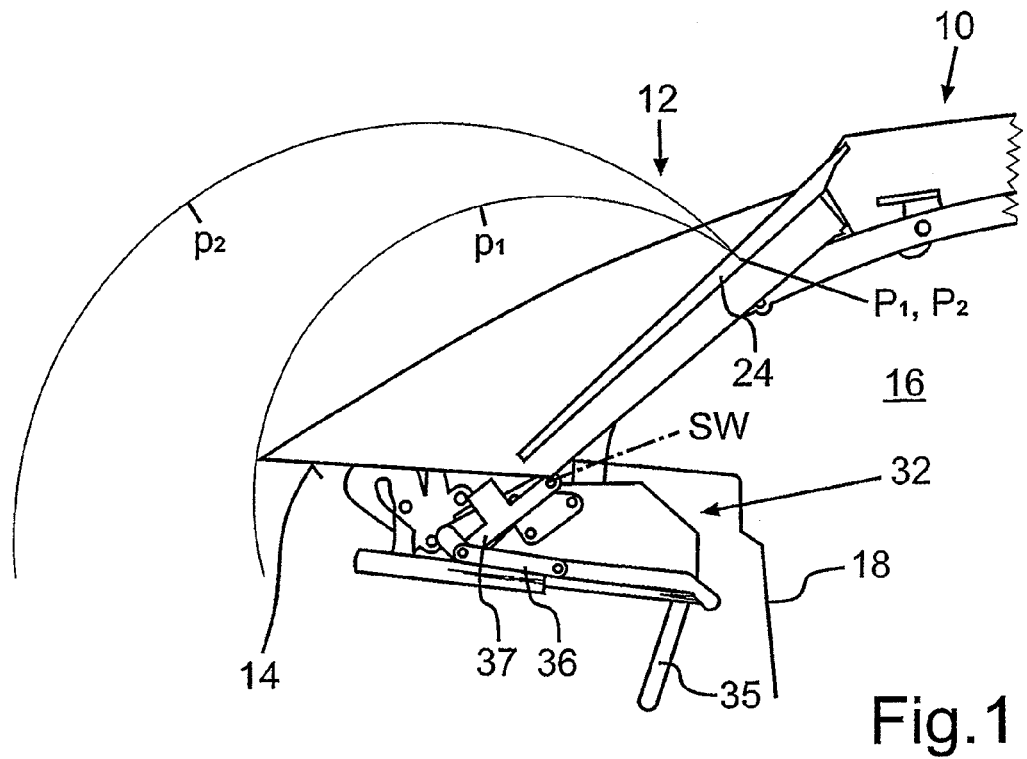
FIG. 1 shows a schematic side view of the folding top according to the invention for an open motor vehicle, of which substantially an upper roof part and a rear roof part comprising a rear window can be seen.
Figure 2:
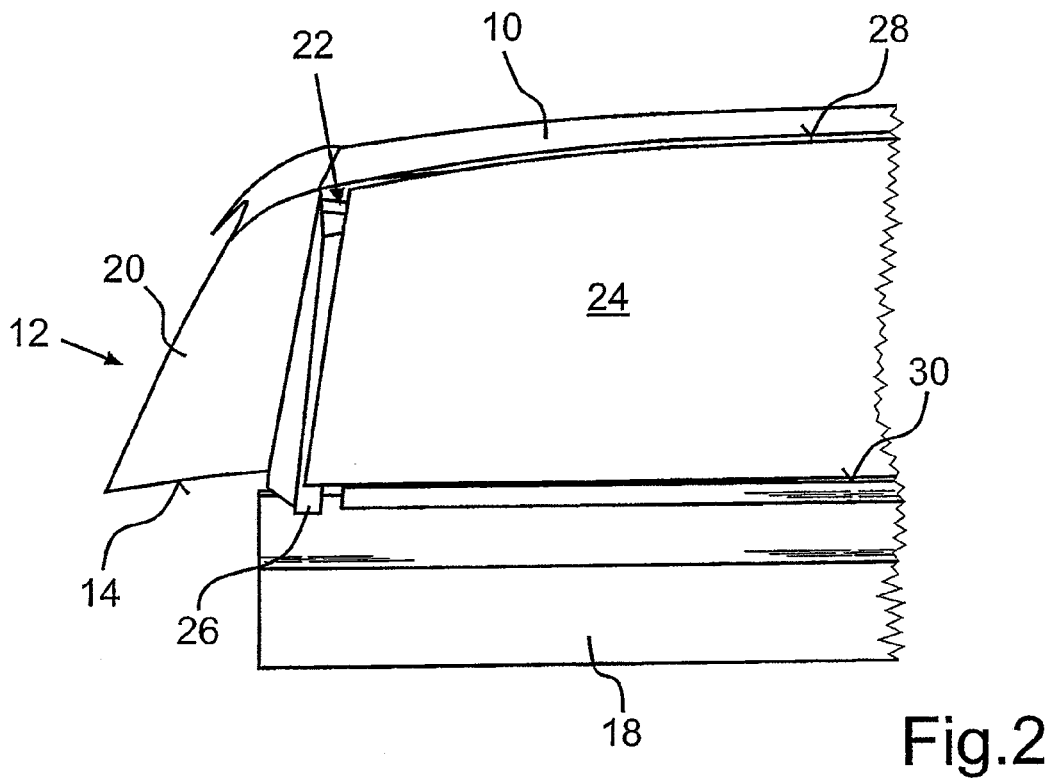
FIG. 2 shows a schematic rear view of the folding top according to FIG. 1.

FIGS. 1 and 2 show, in a schematic side view and rear view respectively, a folding top for an open motor vehicle. The folding top comprises an upper roof part 10 which adjoins a windshield frame (not shown) and a rear roof part 12 which adjoins the upper roof part. The two roof parts 10, 12 in the present exemplary embodiment are designed as intrinsically rigid sheet-metal or plastic shell elements of a so-called hard-top and are connected to one another in an articulated manner at a pivot axis S which extends in the transverse direction of the vehicle and which can be seen in particular in FIGS. 5, 6 and 8. It would be equally conceivable, however, to produce the roof parts 10, 12 from a flexible material. The rear roof part 12 of the folding top, which is represented in its closed position here, in this case terminates in the region of a side wall edge 14 at whose level there extends a rear-end and folding-top compartment lid which is not shown in the drawings. The two roof parts 10, 12 can be transferred from the closed position of the folding top represented in FIG. 1 into a storage position represented in FIG. 8 by means of two parallelogram linkages which are arranged laterally with respect to the folding top and which are illustrated in more detail from FIG. 5 in particular. The basic construction and the mode of operation for transferring the two roof parts 10, 12 into their storage position—with the exception of the mode of operation for transferring the rear window—are disclosed for example in German patent document numbers DE 44 45 944 C1 and DE 44 45 580 C1. In the closed position, the two roof parts 10, 12 cover a passenger compartment 16 which is delimited rearwardly in the region of a rear partition 18.

It can be seen particularly from FIG. 2 that lateral C-pillars 20 of the rear roof part 12 externally delimit a window opening 22 within which a rear window 24 is arranged in its closed position. The rear window 24 extends upwardly to about as far as the rear end of the upper roof part 10 and downwardly to about level with the rear side wall edge 14, with the lower end of the rear window 24 being adjoined by the rear-end and folding-top storage space lid (not shown). The window opening 22 can be delimited upwardly either by the rear end of the upper roof part 10 or by a connection (which cannot be seen here) between the C-pillars 20 of the rear roof part 12. It can be seen particularly from FIG. 2 that the C-pillars 20 of the rear roof part 12 comprise edge regions 26 which extend in the vertical direction of the vehicle and on whose outer side is arranged a window seal which cannot be seen in FIG. 2. In other words, the window seal is arranged between the outer side of the edge regions 26 and the inner side of the rear window 24. It can additionally be seen from FIG. 2 that, when viewed in the transverse direction of the vehicle, the window opening 22 laterally delimited by the edge regions 26 of the C-pillars 20 is of a smaller or narrower design than the rear window 24. It can further be seen from FIG. 2 that the rear window 24 has a substantially trapezoidal shape, with an upper side 28 of the trapezoid being designed to be narrower or shorter than a longer lower side 30 of the trapezoid. On the inner side of the upper side 28 of the trapezoid or of the lower side 30 of the trapezoid is likewise provided a window seal which is arranged on the outer side of the adjacent upper roof part 10 or on the outer side of a vehicle body part in the region of the side wall edge 14.

Figure 3:
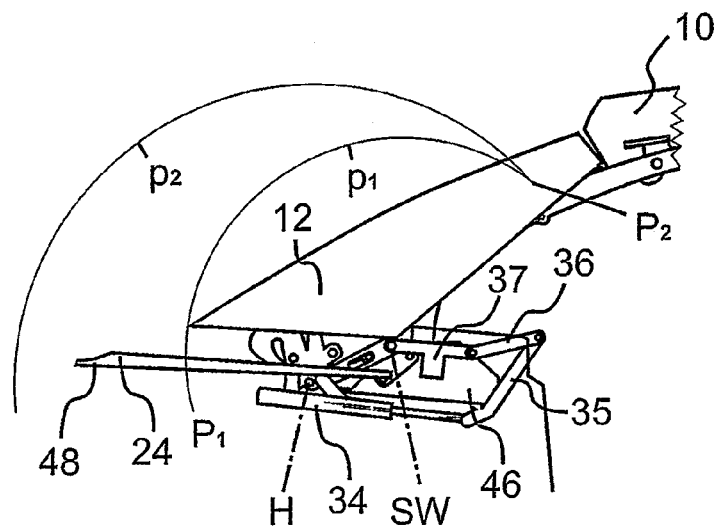
FIG. 3 shows a schematic side view of the folding top according to FIG. 1, in which the rear window has been folded down into an at least approximately horizontal storage position.

FIG. 3 shows the folding top according to FIG. 1 in a schematic side view, in which the rear window 24 has been pivoted from its closed position covering the window opening 22 as shown in FIG. 2 into an open or storage position in which it comes to lie approximately horizontally. For this purpose, a drive mechanism 32 comprises two actuators 34 in the form of hydraulic cylinders which are arranged on both sides of the folding top and which are each connected to the rear window 24 via a toggle lever arrangement comprising a plurality of levers 35, 36, 37. FIG. 1 and FIG. 3 viewed in conjunction show that, for this purpose, the lever 35 has been rotated by approximately half a revolution in the clockwise direction by means of the associated actuator 34. Accordingly, the levers 36 and 37 have been dragged along, with the result that the rear window 24 has been folded down into its horizontal storage position about a window pivot axis SW. In the storage position, the rear window 24 is held for example by rubber buffers or similar holding elements within the concealed storage space for the folding top. When the folding top is in the closed position, the levers 35, 36, 37 are arranged in a dead-center position with respect to one another, with the result that the rear window 24 is pressed securely against its window seal.

Figure 4:
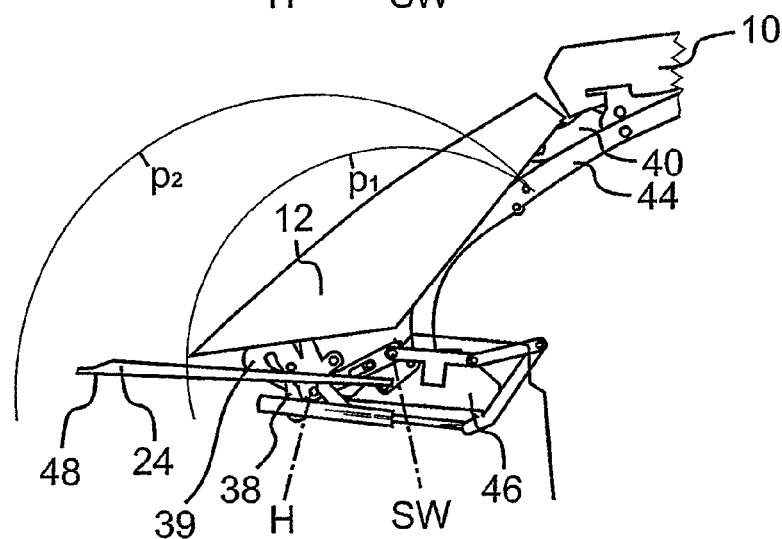
FIG. 4 shows a schematic side view of the folding top according to FIGS. 1 and 3 at the start of the opening movement of the two roof parts.
Figure 8:
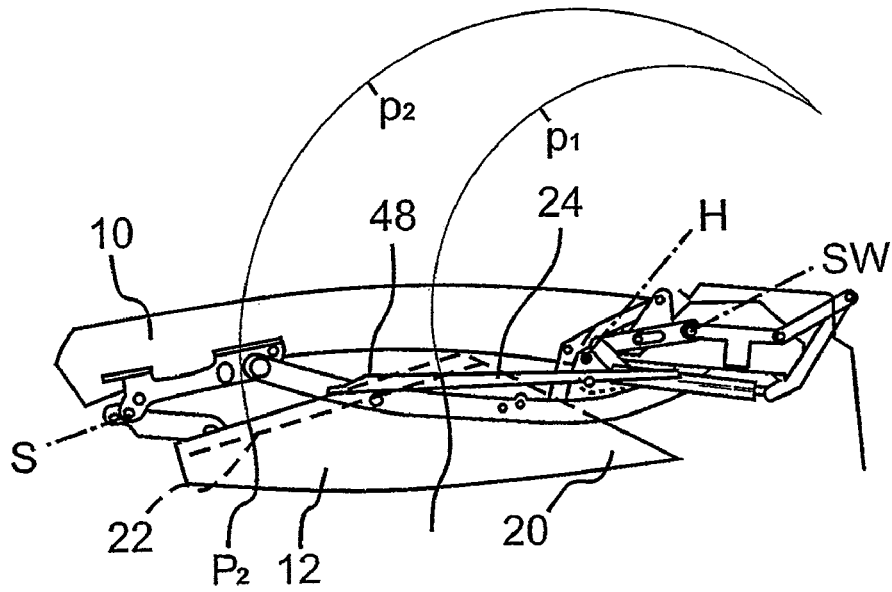
FIG. 8 shows a schematic side view of the folding top according to FIGS. 1 and 3 to 6 in the storage position arranged within a rear-end and folding-top storage space.

FIG. 4 is a schematic side view showing the folding top according to FIGS. 1 and 3, in which, following completion of the pivoting movement of the rear window 24, the two roof parts 10, 12 are now transferred from their closed position into the storage position represented in FIG. 8. For this purpose, use is likewise made of the actuators 34 arranged outside the folding top, these actuators having already been used for transferring the rear window 24 into its storage position. After the toggle lever mechanism comprising the levers 35, 36, 37 has adopted an end position after reaching the storage position of the rear window 24, the respective actuator 34 is held against the lever 35, which remains fixed in position. To transfer the two roof parts 10, 12 into the storage position, the actuator 34, which in turn is connected to the associated parallelogram linkage of the two roof parts 10, 12 via an intermediate lever 38, contracts. As a result, the two roof parts 10, 12 are pivoted about a main pivot axis H of the rear roof part 12. The parallelogram linkage here is substantially composed of a rear main link which, in the present exemplary embodiment, is formed by two part links 39, 40 which are connected to one another in a central region via the intrinsically rigid, fixed rear roof part 12. The first part link 39 here extends at the lower end of the rear roof part 12 as far as the main pivot axis H, while the second part link 40 extends at the upper end of the rear roof part 12 as far as the pivot axis S between the two roof parts 10, 12. The intermediate lever 38 for driving the two roof parts 10, 12 here acts on the first part link 39. There can be seen further components of the respective laterally provided parallelogram linkage, namely an upper intermediate part 42 and a main link 44 which is connected thereto in an articulated manner and which is mounted by way of its lower end on a bracket 46.

Figure 5:
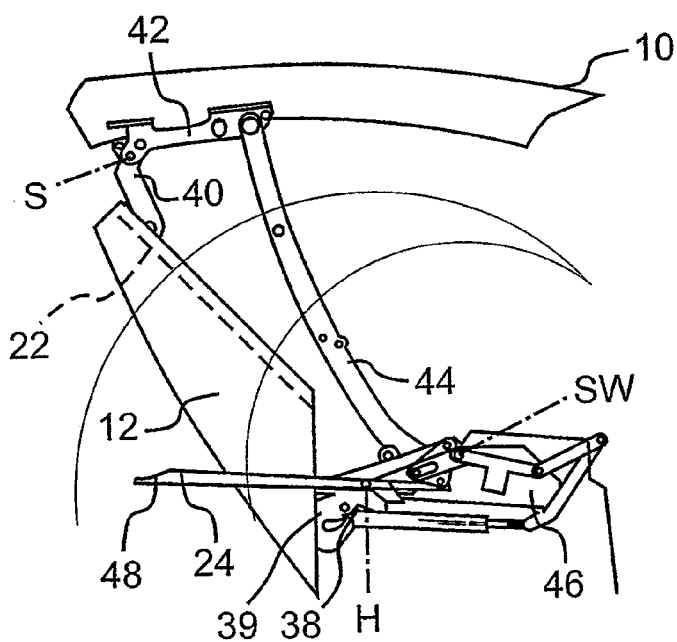
FIG. 5 shows a schematic side view of the folding top according to FIGS. 1, 3 and 4 during the further course of the opening movement of the two roof parts.
Figure 6:
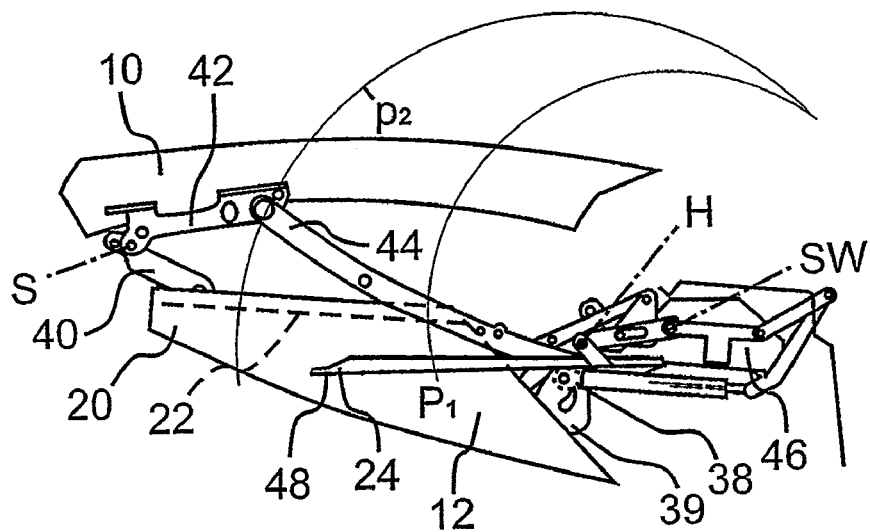
FIG. 6 shows a schematic side view of the folding top according to FIGS. 1 and 3 to 5 in an end phase of the opening movement of the two roof parts.

It is possible to see the further course of the transfer movement of the two roof parts 10, 12 into their storage position when viewing FIGS. 5, 6 and 8 in conjunction, each of these figures showing the folding top in a schematic side view. Thus, FIG. 5 shows a central phase and FIG. 6 an end phase of the transfer movement of the two roof parts 10, 12 into the storage position. In FIG. 8, the two roof parts 10, 12—together with the rear window 24—are then in their final storage position. Since the window pivot axis SW of the rear window 24 is arranged at a considerable distance in front of the main pivot axis H of the rear roof part 12 and, in particular, the C-pillars 20, for example two points $P_1$, $P_2$ on the rear window and on the C-pillars 20 of the rear roof part 12, respectively, these points lying congruently one on top of the other in the closed position according to FIG. 1, move over different movement trajectories $P_1$, $P_2$ in the rearward direction into their storage position. Specifically, while the point $P_1$ on the rear window 24 moves along the trajectory curve $p_1$ from the closed position according to FIG. 1 into the storage position according to FIG. 3, the point $P_2$ on the rear roof part 12 that is congruent with the point $P_1$ is transferred from its closed position represented in FIG. 1 into the storage position represented in FIG. 8 along the trajectory curve $p_2$. In other words, the two points $P_1$, $P_2$, which are congruent when the rear window 24 and the rear roof part 12, are in the closed position follow movement trajectories $p_1$, $p_2$ having different radii. Since the window pivot axis SW and the main pivot axis H of the rear window 24 and of the rear roof part 12 respectively are moreover arranged at different heights when viewed in the vertical direction of the vehicle, a different inclination is obtained for the points $P_1$ and $P_2$ at the start of the transfer from the closed position into the storage position. While the point $P_1$ on the rear window is moved with a relatively gentle gradient along the movement trajectory $p_1$ at the start of the opening movement, the movement trajectory $p_2$ of the point $P_2$ on the rear roof part 12 has a significantly steeper gradient at the start of the opening movement.

Figure 7:
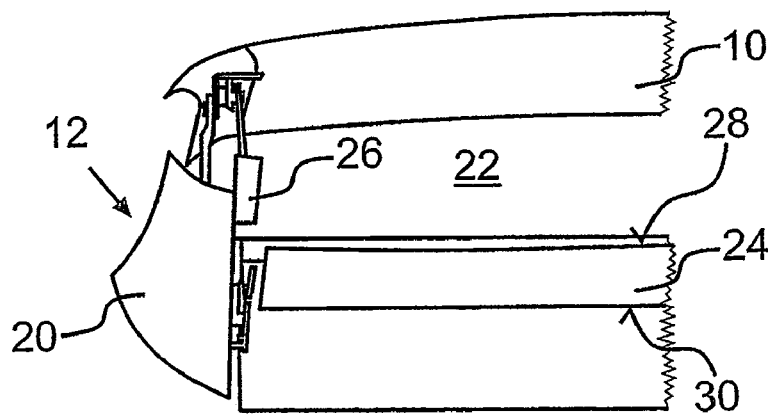
FIG. 7 shows a schematic rear view of the folding top, in which the rear window and the two roof parts are arranged in the position according to FIG. 6.

As a result of the different positions of the pivot axes SW, H of the rear window 24 and the rear roof part 12 respectively, the window opening 22 (delimited laterally by the C-pillars 20 and situated within the rear roof part 12) is displaced further rearward with respect to the rear window 24. As can be seen particularly from FIGS. 6 and 8, as viewed in the longitudinal direction of the vehicle, the rear window 24 comes to lie by way of its upper or rear end region 48 at a considerable distance in front of the associated points on the rear roof part 12. Since the rear window 24 and the associated window opening 22 are of substantially trapezoidal design, the different storage of the rear window 24 and of the rear roof part 12 with the window opening 22 as viewed in the longitudinal direction of the vehicle results not only in an offset in the longitudinal direction of the vehicle but, as can be seen from FIG. 7, also in an offset in the transverse direction of the vehicle. Accordingly, FIG. 7 shows the folding top according to FIG. 6 in a schematic rear view, it being possible to see in particular that the edge regions 26 of the C-pillars 20 of the rear roof part 12 can be moved past the rear window 24, which is already situated in its storage position, in the course of the opening movement of the folding top. In this respect, it can be seen from FIG. 7 that the rear roof part 12 can be displaced further rearward with respect to the rear window 24 by such a distance that the edge regions 26 of the C-pillars 20 can be guided around the rear window 24 or the latter can be guided through the window opening 22. As a result, with the folding top in the storage position, the rear window 24 thus comes to lie above the window opening 22, substantially between the rear and upper roof parts 10, 12. In other words, the different arrangement of the window pivot axis SW of the rear window 24 and of the main pivot axis H of the rear roof part 12 enables the rear window 24 to be raised in the direction of the upper roof part 10 which covers it, with the result that more space remains within the folding-top storage space (not shown) when the folding top is opened. Moreover, the rear window 24 is arranged in a more secure position close to the upper roof part 10, with the result that, for example, goods arranged within the folding-top and trunk space cannot cause damage to the rear window 24.

The scope of the invention is considered to include the possibility that the rear window 24 and the two roof parts 10, 12 can also be operated via separate drive mechanisms 32. Also considered to be included is the possibility that the rear window 24 does not absolutely have to be completely stowed away before the opening of the two roof parts 10, 12 can begin. Likewise, it would of course also be conceivable to open the rear window 24 and the two roof parts 10, 12 in a superimposed movement. In that case, however, care would have to be taken to ensure that the rear window 24 can be guided through the window opening 22 and moreover not make contact with the two roof parts 10, 12. In order to supply the passenger compartment 16 with fresh air, it would additionally be conceivable to design the rear window 24 such that it can be opened independently of an opening and closing movement of the folding top.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A folding top for a motor vehicle, comprising:
   a rear roof part which delimits a window opening for a rear window and is displaceable about a main pivot axis while transferring the folding top from a closed position into a storage position, wherein the rear window is pivotable relative to the rear roof part about a window pivot axis which extends at a distance from the main pivot axis, wherein the rear window bears against the rear roof part from outside of the rear roof part when the folding top is in the closed position and, when the folding top is transferred into the storage position, the rear window moves through the window opening.

2. The folding top as claimed in claim 1, wherein the window pivot axis of the rear window is arranged at a distance in front of the main pivot axis of the rear roof part.

3. The folding top as claimed in claim 1, wherein the rear roof part or the rear window is displaceable about the main pivot axis or the window pivot axis along an associated trajectory curve, wherein a trajectory curve of the rear window extends in front of a trajectory curve of the rear roof part as viewed in a longitudinal direction of the vehicle.

4. The folding top as claimed in claim 1, wherein the rear window covering the window opening has a substantially trapezoidal shape, wherein an upper side of the trapezoid is shorter than a lower side of the trapezoid.

5. The folding top as claimed in claim 1, wherein, when the folding top is in the storage position, an upper end of the rear window lies at a distance in front of an associated upper end of the window opening.

6. The folding top as claimed in claim 1, wherein the rear window is mounted firmly on the body of the motor vehicle.

7. The folding top as claimed in claim 6, wherein the rear window and the rear roof part are mounted on lateral brackets secured to the body of the motor vehicle.

8. The folding top as claimed in claim 1, wherein the rear window is foldable down into the storage position at least approximately completely before the rear roof part is transferred from the closed position into the storage position.

9. The folding top as claimed in claim 1, wherein the rear window extends substantially at least approximately horizontally in its storage position.

10. The folding top as claimed in claim 1, wherein the rear window in its storage position is arranged below an upper roof part of the folding top.

11. The folding top as claimed in claim 1, wherein, when transferring the folding top into the storage position, a trajectory curve followed by a point on an upper end of the window opening extends, at least in certain regions, outside of a trajectory curve followed by an associated point on the upper end of the rear window.

12. The folding top as claimed in claim 1, wherein a window seal of the rear window is arranged at least in a region of C-pillars of the rear roof part.

13. The folding top as claimed in claim 1, wherein the rear roof part and the rear window moveable using a common drive mechanism.

14. The folding top as claimed in claim 1, wherein the rear window is moveable independently of the rear roof part.

15. The folding top as claimed in claim 1, wherein the window opening for the rear window is delimited by an upper roof part of the folding top.

16. The folding top as claimed in claim 1, wherein the window opening for the rear window is delimited by a connection between C-pillars of the rear roof part.

17. The folding top as claimed in claim 1, wherein the rear roof part or a front roof part is of multi-part design or made of flexible material.

18. The folding top as claimed in claim 1, wherein levers of a drive mechanism for the rear window are arranged in a dead-center position relative to one another when the folding top is in the closed position, such that the rear window is pressed securely against its window seal.

19. A folding top for a motor vehicle, comprising:
an upper roof part;
a rear roof part, coupled to the upper roof part, that includes a window opening and is displaceable about a main pivot axis while transferring the folding top from a closed position into a storage position; and
a rear window that is pivotable relative to the rear roof part about a window pivot axis displaced from the main pivot axis, wherein
when the folding top is in the closed position the rear window bears against an outside of the window opening of the rear roof, and
when the folding top is transferred into the storage position, the rear window moves through the window opening.

* * * * *